United States Patent [19]

Hermann et al.

[11] 3,941,201

[45] Mar. 2, 1976

[54] TRAFFIC MERGING METHOD AND MEANS

[75] Inventors: Walter Hermann, Weissenfeld; Peter Kraus, Munich, both of Germany

[73] Assignee: Messerschmitt-Bolkow-Blohm GmbH, Germany

[22] Filed: July 25, 1973

[21] Appl. No.: 382,553

[30] Foreign Application Priority Data

Aug. 1, 1972 Germany........................... 2237763

[52] U.S. Cl................... 180/98; 246/167 R; 340/33; 340/36

[51] Int. Cl.²........................................... B60L 15/40

[58] Field of Search........... 246/167, 187 C; 340/36, 340/31 R, 33; 180/98; 104/149

[56] References Cited

UNITED STATES PATENTS

| | | | |
|---|---|---|---|
| 3,403,634 | 10/1968 | Crowder | 104/138 |
| 3,442,347 | 5/1969 | Hodgson | 180/98 |
| 3,537,401 | 11/1970 | Metzner | 104/149 |
| 3,650,216 | 3/1972 | Harwick | 104/166 |
| 3,771,463 | 11/1973 | Smoot | 104/155 |
| 3,790,780 | 2/1974 | Helmcke | 246/187 C |
| 3,796,871 | 3/1974 | Helmcke | 246/167 R |

*Primary Examiner*—Robert R. Song
*Assistant Examiner*—Terrance L. Siemens
*Attorney, Agent, or Firm*—Toren, McGeady and Stanger

[57] ABSTRACT

Two crowded single file traffic lanes of electronically speed-controlled vehicles are merged at a merge point by electronically establishing gaps sufficient to accept vehicles between the vehicles of each lane before they approach the merge point. The vehicles of one lane are then electronically guided into the gaps of the other as they pass the merge point. Lane-side transmitters and receivers along each lane cooperate with the vehicles to control the spacing between the vehicles in the approach toward the merge point. The gaps are established and the vehicles guided by signalling electronic images of each vehicle to the other lane and by guiding each vehicle as if the imaged vehicle were an actual vehicle in front of it.

4 Claims, 5 Drawing Figures

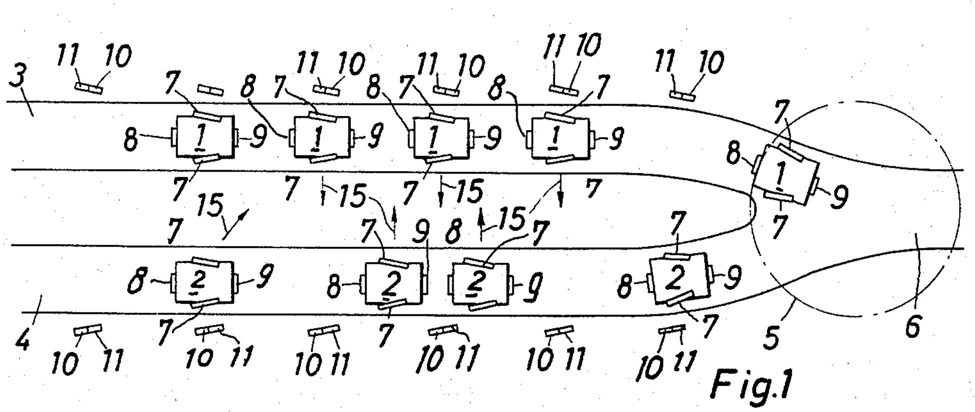
Fig.1
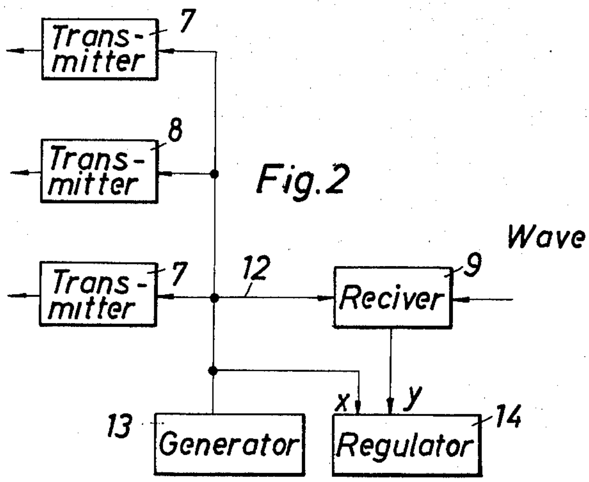
Fig.2
Fig.3
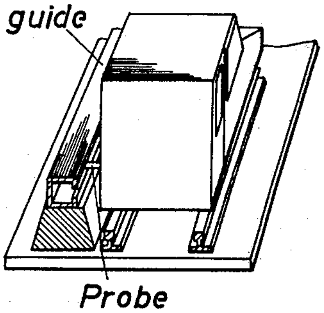
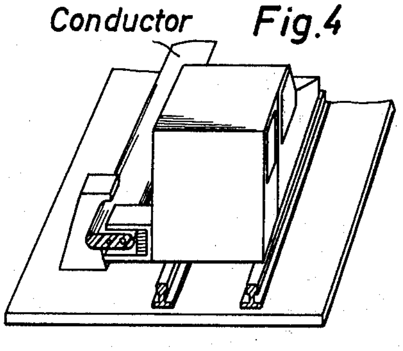
Fig.4
Fig.5
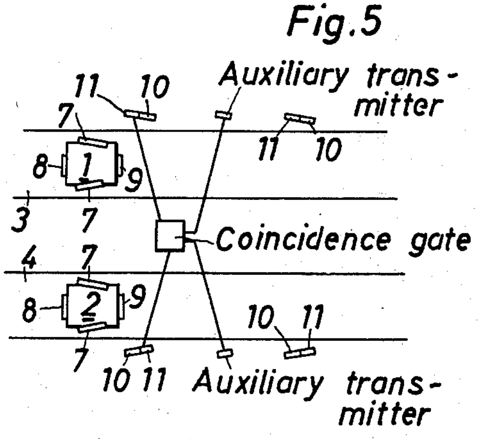

TRAFFIC MERGING METHOD AND MEANS

REFERENCE TO RELATED CO-PENDING APPLICATIONS

This application relates to two co-pending applications of Conrad Helmcke and Hans J. Wendt, both assigned to the same assignee as this application, Ser. Nos. 234,604 and 234,605, filed Mar. 14, 1972. These applications have now matured into U.S. Pat. Nos. 3,790,780 and 3,796,871, respectively. The contents of those applications are made a part of this application as if fully recited herein.

BACKGROUND OF THE INVENTION

This invention relates to transport or conveyor systems, and particularly to methods and means for merging vehicles travelling in two separate lanes into a single lane.

As used herein, the term "vehicle" is meant in the general sense to include any object whose movement is controlled within a transport or conveyor system.

Any traffic or transportation system with branching roads operating with freely moving objects, for example, street traffic, poses the problem of smoothly merging traffic at merge points, without excessive delays or stops. The problem is especially difficult where individual vehicles are to be fed from one traffic lane into a main traffic artery.

The aforementioned copending Application Ser. No. 234,605 discloses merger of two equidirectional single-lane traffic flows by forming gaps between the vehicles of each traffic flow even before a merge point is noticed, and then feeding the vehicles of one lane into the gaps of the other at the merge point. In a range before the merge point, the vehicles of the two traffic flows behave as if each of the lanes or tracks were already occupied with all the vehicles moving within this range on both tracks/lanes. Within each of the traffic flows, the speeds are first adjusted to each other. Vehicles of each traffic flow are signaled or imaged into the other flow and the signaled vehicle is "seen" by the adjacent object in the other traffic flow as an object immediately ahead of it. Furthermore, the traveling speed of each object is controlled in dependence on the traveling speed of the signaled object immediately ahead.

This system allows individual vehicles to pass through the merge point without stopping. When the speed of all the vehicles in the range ahead of the merge point is adjusted to the speed of the vehicle after the merge point, the two traffic flows before the merge point can practically never jam. However, it was found that, particularly in sections with a dense sequence of branches, the above mentioned adjustment of the speeds of the two traffic flows before the merge point can reduce the mean speed of the faster vehicles. This occurs when two vehicles following each other in separate lanes or tracks approach a merge point at different speeds. If the leading vehicle is the one whose speed is already adjusted to a nominal speed, and the following vehicle in the other lane is the faster vehicle, the latter is decelerated to the nominal speed when it reaches the above-mentioned range. That is, the faster vehicle is decelerated to the speed of the leading vehicle even though it has not received a signal from this (slower) vehicle.

An object of the invention is to improve systems and methods of this type.

Another object of the invention is to prevent the aforementioned difficulties.

SUMMARY OF THE INVENTION

According to a feature of the invention, these objects are attained in whole or in part, by forming signals representative of the vehicles of one traffic flow and transmitting the signals to the vehicles in the other flow within the approach range to the merge point so that the signaled vehicle is interpreted by the adjacent vehicle in the other traffic flow as a vehicle immediately ahead of it. The travel speed of each vehicle is controlled in dependence on the travel speed of the signaled vehicle immediately ahead. The following one of two vehicles traveling on separate lanes or tracks is braked in the above mentioned range only if the distance between the two objects is too small at their traveling speeds. Thus, if vehicles approach the range (before the merge point) on only one of the two tracks or lanes at a high speed, these can pass through the range without reducing their speed; braking of the objects is necessary only if slower objects are ahead of them on the same track or lane.

These and other features of the invention are pointed out in the claims. Other objects and advantages of the invention will become obvious from the following detailed description when read in light of the accompanying drawings.

BRIEF DESCRIPTION OF THE DRAWING

In the drawing:

FIG. 1 is a plan view of a traffic pattern which is controlled by a system embodying features of the invention and which involves cars travelling in two separate lanes which merge into a third lane;

FIG. 2 is a block diagram illustrating the driving and braking control embodying features of the invention with which each car of FIG. 1 is equipped;

FIGS. 3 and 4 are perspective views illustrating other types of transmission systems usable between transmitters and receivers of the cars 1 and 2; and FIG. 5 is a schematic diagram illustrating a detail of a control usable in FIG. 1.

DESCRIPTION OF PREFERRED EMBODIMENTS

In FIG. 1 two sets of cars 1 and 2 constitute individual vehicles or means of transportation in a commuter system wherein each car must move automatically without stopping between a departure and a target station. The cars 1 move along a lane 3 while the cars 2 move along a lane 4. The cars 1 and 2 are to be fed at a merge point 5 defined by a circle into a third lane 6. The cars 1 and 2 move in the direction of the merge point 5 and pass through the merge point without stopping. Gaps are formed between the respective cars 1 in lane 3 and between the respective cars 2 in lane 4 so that these gaps can be occupied at the merge point 5 as the cars 1 and 2 alternately merge into the lane 6. Thus, only one car of lane 3 or 4 reaches the merge point or feed point 5 at any one time. The manner of creating the gaps for interleaving and merging the cars is described below.

Each of the cars 1 and 2 is equipped with transmitters 7 and 8 and receivers 9. According to one embodiment of the invention the transmitters and receivers transmit and receive electromagnetic waves. According to another embodiment of the invention, these electromagnetic waves are light waves. According to still another embodiment of the invention the transmitters and receivers operate with sound waves, such as ultrasonic signals.

The transmitters 7 are mounted on the longitudinal sides of the cars 1 and 2. The transmitters 8 are mounted on the rear of the cars 1 and 2. The receivers 9 are mounted on the front of the cars.

The transmitters 7 and 8 and the receivers 9 are portable transmitters by virtue of their being mounted on cars 1 and 2.

Stationary transmitters 10 as well as stationary receivers 11 are located in the range defining the approaches to the merge point 5 along the lanes 3 and 4. Each stationary receiver 11 receives signals from an associated portable transmitter 7 facing it from a car 1 or 2 travelling on the adjacent lane. Each transmitter 10 transmits signals to the portable receiver of the car approaching it. The portable transmitters 7 on the cars 1 which face lane 4 do not emit signals. Similarly, the transmitters 7 on the cars 2 which face lane 3 do not emit signals. They thus transmit only when they are directed toward a receiver 11 in the lane of the car. Of course, the system can be embodied so that the transmitting devices 7 on the cars 1 and 2 can be directed toward the opposite lanes if the receivers 11 are arranged on the latter.

The stationary transmitters 10 and receivers 11 are equally spaced along the lanes 3 and 4. The transmitters 10 of lane 3 are associated with the receivers 11 of the lane 4 which are arranged at the same distance from the merge point. Correspondingly, the transmitters 10 of lane 4 are associated with the receivers 11 of the lane 3 that are arranged in the same distance from the merge point. Each receiver receives signals from its associated transmitter. However, each receiver 11 can receive signals from only one transmitter, namely the transmitter that is arranged at the same distance from the merge point.

The above-described arrangement of stationary transmitters and receivers 10 and 11 thus permits the transmission of signals between two cars 1 and 2 which are moving on separate lanes 3 and 4 respectively. The transmitters 8 on the rear of the cars also furnish communication but only between cars following each other directly in the same lane. According to an embodiment of the invention, the transmitters 7 on the longitudinal sides of the cars 1 and 2 and the stationary receivers 11 operate in a different frequency band than the transmitters 8 and 10 and the receivers 9. A conventional coincidence circuit causes only one of two transmitters at the same level to transmit when two cars move side by side, such as the last two cars 1 and 2. An auxiliary transmitter, not shown in FIG. 1, staggered in the direction of a merge point 5, emits the signal transmitted from one of these cars.

Thus, such auxiliary transmitters are located between the transmitters 10 of FIG. 1.

The signal transmitted from a car serves to control the driving behavior of the immediately following car in such a way that a collision is practically impossible. This is explained below. In this environment it is irrelevant whether the signal received by a car is emitted from a car in the lane of the receiving car or from a car in an adjacent lane. In either case the signal temporarily reduces the speed of the receiving car if there is no distance or an insufficient distance between the receiving car and the transmitting car. Consequently, with cars 1 and 2 occupying the lanes 3 and 4 as shown in FIG. 1, the cars between which there are no gaps that can be filled by a car of the adjacent lane will be slowed to form a gap.

As far as the last two cars are concerned, the car 2 in lane 4 can receive a signal from the car 1 of lane 3 through the beforementioned auxiliary transmitters. Both cars thus receive signals. However, the car in lane 3 slows down more. This is because in car 1 it is the nearest transmitter 10 arranged at the same level that transmits. Consequently, when both signals have equal intensity, one can be received so that it is stronger than the other.

Each car 1 and 2 includes an automatic drive and brake control system including the transmitters 7 and 8 as well as receiver 9. The system in one car is illustrated in FIG. 2. A common control line 12 applies a modulating voltage from a generator 13 to the transmitters 7 and 8 as well as the receiver 9. The generator 13 furnishes a voltage which varies with the speed of the car. For this purpose the generator 13 is coupled to a wheel of the car. The generator voltage along the line 12 varies the output power of the transmitters 7 and 8 inversely with the speed of the car. On the other hand, the output of the generator 13 along the line 12 varies the sensitivity of the receiver 9 with the speed of the car. Thus, when the car stops the transmission power of the transmitters 7 and 8 reaches a maximum and the sensitivity of the receiver 9 falls to a minimum. At the maximum speed of the car the transmitting power reaches a minimum and the sensitivity a maximum. Correspondingly, the intensity of the transmitted and received signals will vary.

The output of the generator 13 forms a control quantity or control value $x$ which is applied to a regulator 14 associated with the drive (not shown) of the car. The output of the receiver 9 forms a guide quantity or guide value y which is also applied to the regulator 14. The guide quantity y varies not only with the speed of the receiving car but also with the speed of the transmitting car and with the distance between the two cars. The regulator 14 controls the braking of the car as part of the beforementioned drive (not shown).

If the regulator 14, in comparing the control value $x$ and the value $y$, notes that the guide value $y$ has been exceeded by the control value $x$, the receiving car is automatically slowed down by braking or deceleration. The value $x$ exceeding the guide value $y$ is always an indication that the car must reduce its speed of the collision with the transmitting cars to be avoided. If the transmitting car is actually in the adjacent lane the distance from merge points as the receiving car, or there is insufficient distance, relative to the merge point from the transmitting car, the receiving car will increase its distance from the car actually ahead of it. The deceleration will continue until there is a sufficient distance from the transmitting car. This way a gap for the transmitting car is produced ahead of the receiving car. This gap can be filled by the transmitting car at the merge point 5. It goes without saying that deceleration of a car 1 or 2 also can be caused simultaneously by a car actually ahead of the receiving car and by a car moving in the adjacent lane. In this case the signals received are added to each other.

This insures that the merge point can never be reached simultaneously by two cars.

As a rule each car that receives a signal from a car in the adjacent lane will effectively sense that there exists no clearance between it and the other car. The receiving car thus receives a signal whose intensity corresponds to that of an impending collision or an actual collision. In order to prevent the car from responding by suddenly braking the transmission power of the stationary transmitters 10 varies. The transmitters 10 just prior to the merge point 5 transmit far stronger signals than those before them. The transmitting power of the transmitters 10 decreases with the distance from the merge point 5. This is accomplished by the use of suitable amplifiers in each stationary transmitter 10.

The above-described transmitters and receivers 10 and 11 along the lanes 3 and 4 thus cause the drive and brake controls of all the cars 1 and 2 with transmitters and receivers 7, 8 and 9 to behave as if the approaches to merge point 5 in each lane 3 and 4 were occupied by all the cars within the approaches. They can thus pass through the merge point without stopping. In addition, no gaps are formed in lane 6 as might have been if cars stopped at the merge point.

It will be recognized that the arrangement of cars in FIG. 1 is only an example that depends upon the sequence of the cars 1 and 2. Gaps can be created between the cars of each lane 3 and 4 for several car lengths in the approaches.

Moreover, the invention is not limited to methods and means utilizing wireless transmission of signals. According to another embodiment of the invention, each of the transmitters and receivers are coupled to wave guides which are laid along the lanes. These wave guides are in the form of slotted tubular conductors into which the probes of the cars can be introduced. According to an embodiment of the invention the probes are introduced on a contact-free basis. The probes serve as antennas of the transmitters and receivers of the cars.

According to another embodiment of the invention, ordinary conductors are used instead of tubular conductors. In this case the signals are transmitted inductively, if necessary, between the conductors and the transmitters and receivers of the cars.

According to another embodiment of the invention virtual images of the cars are simulated by laser beams.

According to still another embodiment of the invention, all the transmitters and receivers are equipped with identical antennas that are rotatable for curves.

It should be noted that in the operation of this system the cars, by means of transmitters 8 and receivers 9 space, each other along the lanes in accordance with their speeds. If their speeds are identical they can be virtually touching each other and proceed at the speed. As the cars approach the merge point 5, the transmitters 7 announce the presence of the cars to the receivers 11. Each receiver 11 then actuates a transmitter 10 to transmit signals toward receivers 9 of the opposite lane. This in effect forms an electronic image of a car in one lane in the adjacent lane. The receiver 9 in the receiving car then causes the receiving car to behave as if the car in the other lane were actually directly ahead of it. Thus, the spacing between the cars is increased so that the cars can pass through the merge point, while the cars are approaching point 5.

The lanes 3 and 4 as well as the lane 6 may constitute roadways, tracks, conveyor paths or any other arrangement of a transport system according to various embodiments of the invention.

The term merge point or feed point as used herein may be regarded as the merge zone defined by the circle in FIG. 1.

The general operation of the cars 1 and 2 as they proceed along a single file is described more fully in the co-pending application, Ser. No. 234,604. The content of that application is herewith made a part of this application as if specifically recited herein.

According to an embodiment of the invention, the signals received by each of the receivers 11 in each lane are passed to the transmitter 10, in the opposite lane, whose distance from the point 5 equals the distance of the receiver, by suitable conductors.

FIGS. 3 and 4 illustrate various other types of transmission systems usable between the transmitters and receivers of the cars 1 and 2.

FIG. 5 illustrates the use of coincidence circuits and auxiliary transmitters as described above.

While embodiments of the invention have been described in detail, it will be obvious to those skilled in the art that the invention may be embodied otherwise.

What is claimed is:

1. The method of merging vehicles, travelling single file in each of two separate lanes, into a single lane, comprising electronically operating the vehicles in each lane to establish minimum gaps between each vehicle and the vehicle immediately ahead in the same lane, electronically changing the operation of the vehicles as the vehicles approach the merge point to form additional gaps, filling the additional gaps of one lane with the vehicles of the other lane at the merge point, the step of changing the operation including forming a signal representative of each vehicle of one lane in the other lane in a predetermined range approaching the merge point and varying the speed of each of the vehicles as if each signal formed by a vehicle just closer to the merge point or equidistant to the merge point, were a vehicle directly ahead, the step of electronically controlling the speed of the vehicle including maintaining the speed of the vehicles in one lane until it receives signals that it is too close behind another vehicle in its lane or to form an additional gap.

2. In the method of merging the vehicles travelling single file in each of two separate lanes into a single lane, wherein each vehicle is electronically operated in each lane partially in response to control signals indicating that the vehicle is getting too close to the vehicle immediately ahead in the same lane so as to establish gaps between the vehicles, and wherein the operation of the vehicles are changed as the vehicles approach the merge point to form additional gaps by forming within a predetermined range at the merge point additional control signals representative of vehicles in one lane and transmitting it to the vehicles in the other lane so that each vehicle speed is adjusted in response to the control signals as if each control signal formed by a vehicle just closer to the merge point were a vehicle directly ahead, and wherein the additional gaps of one lane are filled with vehicles of the other lane at the merge point, the improvement comprising maintaining the speed of the vehicles until a vehicle receives a control signal.

3. A system for merging vehicles travelling in single file in each of two separate lanes into a single lane, comprising control means in the vehicles for electronically controlling the speed of the vehicle in each lane to form gaps between each vehicle and the vehicle immediately ahead in the same lane, changing means in the vicinity of a merge point for changing the operation of the vehicles as the vehicles approach the merge point to form additional gaps, said changing means including signal forming means in each vehicle directed toward the lane other than the one in which the vehicle is travelling, said changing means further including stationary signal relaying means in each lane for receiving signals from vehicles in the opposite lane and transmitting them to vehicles in the same lane, receiver means in each vehicle responding to the signals from the relaying means in the same lane for establishing an indication as if each signal formed by a vehicle just closer to the merge point or equidistant to the merge point were a vehicle directly ahead so that said vehicle forms additional gaps, said control means including means for guiding each vehicle of one lane into the additional gaps formed by the vehicles in the other lane, said control means including means for electronically maintaining the speed of the vehicles in each lane until receipt of a signal indicating it is too close behind the vehicle ahead or a signal to form additional gaps.

4. In a system for merging vehicles travelling single file in each of two separate lanes into a single lane, comprising control means mounted in each of said vehicles for controlling the speed of each vehicle and spacing the vehicles, a plurality of sensing means along given ranges of said paths approaching the merge points for sensing the presence of each vehicle in the ranges, and a plurality of regulator means each responsive to one of said sensing means and communicating with said control means for constraining said control means in each of the paths to form gaps between the vehicles at locations corresponding to the vehicles in the other paths, said control means in each of said vehicles including electrical means which coact with the electrical means and the control means of an immediately preceding vehicle and an immediately following vehicle to control the speed of each vehicle on the basis of its speed as well as the speed of the immediately preceding vehicle, said control means including means otherwise maintaining the speed of each vehicle and spacing the vehicles in each lane independent of the speed of the vehicles and the spacing of the vehicles in the other lane.

* * * * *